(12) United States Patent
Lee et al.

(10) Patent No.: US 11,717,996 B2
(45) Date of Patent: Aug. 8, 2023

(54) MOLDING METHOD (71) Applicant: KING STEEL MACHINERY CO., LTD., Taichung (TW)

(72) Inventors: Yi-Chung Lee, Taichung (TW); Liang-Hui Yeh, Taichung (TW); Ching-Hao Chen, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 91 days.

(21) Appl. No.: 17/330,222

(22) Filed: May 25, 2021

(65) Prior Publication Data

US 2022/0097266 A1 Mar. 31, 2022

Related U.S. Application Data

(60) Provisional application No. 63/083,509, filed on Sep. 25, 2020.

(51) Int. Cl.
*B29C 44/42* (2006.01)
*B29C 44/02* (2006.01)
*B29C 44/60* (2006.01)

(52) U.S. Cl.
CPC .............. *B29C 44/42* (2013.01); *B29C 44/02* (2013.01); *B29C 44/60* (2013.01)

(58) Field of Classification Search
CPC .......... B29C 2045/14213; B29C 44/60; B29C 44/0415; B29C 44/02; B29C 44/42
See application file for complete search history.

(56) References Cited

U.S. PATENT DOCUMENTS

| 2007/0187859 A1* | 8/2007 | Kaneko ................. B29C 44/348 425/542 |
| 2012/0052143 A1 | 3/2012 | Chen et al. |
| 2015/0035193 A1* | 2/2015 | Wang .................... B29C 44/105 264/54 |

(Continued)

FOREIGN PATENT DOCUMENTS

| CN | 109605645 A | 4/2019 |
| EP | 0799853 A1 | 10/1997 |
| EP | 2402138 A1 | 1/2012 |

(Continued)

OTHER PUBLICATIONS

Office action, Cited References and Search report dated Mar. 28, 2022 issued by the Taiwan Intellectual Property Office (TIPO) for the Taiwanese counterpart application No. 110134287.

(Continued)

*Primary Examiner* — Stella K Yi
(74) *Attorney, Agent, or Firm* — WPAT Law; Anthony King (57) ABSTRACT

A molding method includes providing a molding device, wherein the molding device includes a mold cavity, a feeding port in communication with the mold cavity, and a junction point in connection with the mold cavity; engaging an outlet of an injector to the feeding port; injecting a molding material including a blowing agent into the mold cavity from the feeding port by the injector; and injecting a gas into the mold cavity through the junction point to increase a pressure inside the mold cavity to a predetermined pressure for maintaining the blowing agent in a supercritical state.

20 Claims, 6 Drawing Sheets

(56) References Cited

U.S. PATENT DOCUMENTS

2019/0389100 A1 12/2019 Lin et al.
2020/0180195 A1 6/2020 Chen et al.

FOREIGN PATENT DOCUMENTS

| JP | 2004-082547 | A | 3/2004 |
| JP | 2009172780 | A | 8/2009 |
| JP | 2010201640 | A | 9/2010 |
| JP | 2020026074 | A | 2/2020 |
| JP | 2020090086 | A | 6/2020 |
| TW | M592818 | U | 4/2020 |
| TW | 202021773 | A | 6/2020 |

OTHER PUBLICATIONS

Office Action, Cited References and the Extended European Search Report dated Feb. 15, 2022 from the European Patent Office of EP counterpart application No. 21197568.5-1017.
English Abstract Translation of JP2009172780A.
Office Action from the Japan Intellectual Property Office of JP patent application No. 2021-132653 dated Aug. 2, 2022.

\* cited by examiner

MOLDING METHOD

CROSS-REFERENCE TO RELATED APPLICATION

This application claims priority of U.S. provisional application Ser. No. 63/083,509, filed on Sep. 25, 2020, which is incorporated by reference in its entirety.

TECHNICAL FIELD

The present invention is related to a molding method; in particular, to a molding method suitable for use in injection molding or extrusion molding.

BACKGROUND

Foamed polymer articles have many advantages, such as high strength, light weight, impact resistance, good sound insulation, thermal insulation, etc. The foamed polymer article can be made into a molded article having a predetermined shape by injection molding or extrusion molding. For example, a molding material including a polymeric material and a blowing agent is provided and injected or extruded into a mold cavity of a molding device to form the desired foamed polymer article. Properties and applications of the foamed polymer articles can be altered by adjusting molding methods.

In general, appearance and physical properties of the foamed polymer articles are directly affected by the molding process, and hence, the process of molding must be designed while considering the property of the blowing agent of the molding material so that the molding material can be distributed in the mold cavity uniformly and rapidly. Further, a distribution density of bubble pores in the molding material must be high and uniform during the molding process so as to retain the original physical property of the foamed polymer article. Although foamed polymer articles formed using the molding device have many advantages and applications, their shortcomings continue to create limitations and restrictions that need to be reduced.

BRIEF SUMMARY OF THE INVENTION

One purpose of the present invention is to provide an extruding system and a method of extruding a mixture.

According to one embodiment of the present disclosure, a molding method is disclosed. The molding method includes providing a molding device, wherein the molding device includes a mold cavity, a feeding port in communication with the mold cavity, and a junction point in connection with the mold cavity; engaging an outlet of an injector to the feeding port; injecting a molding material including a blowing agent into the mold cavity from the feeding port by the injector; and injecting a gas into the mold cavity through the junction point to increase a pressure inside the mold cavity to a predetermined pressure for maintaining the blowing agent in a supercritical state.

According to one embodiment of the present disclosure, a molding method is disclosed. The molding method includes providing a molding device, wherein the molding device includes a mold cavity, a feeding port in communication with the mold cavity, and a junction point in connection with the mold cavity; providing an injector disposed over the molding device, wherein the injector includes an outlet; engaging the outlet to the feeding port; supplying a molding material from the feeding port into the mold cavity, wherein the molding material includes a polymeric material and a blowing agent; sensing a first pressure in the mold cavity after the supplying of the molding material; and injecting a gas into the mold cavity through the junction point to increase a pressure inside the mold cavity from the first pressure to a second pressure substantially greater than the first pressure.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages, such as those for quantities of materials, durations of times, temperatures, operating conditions, ratios of amounts, and the likes thereof disclosed herein, should be understood as modified in all instances by the term "about." Accordingly, unless indicated to the contrary, the numerical parameters set forth in the present disclosure and the attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The present invention discloses a molding method including adjusting or increasing a pressure inside a mold cavity after injecting a molding material including a blowing agent into the mold cavity.

Figure 1:
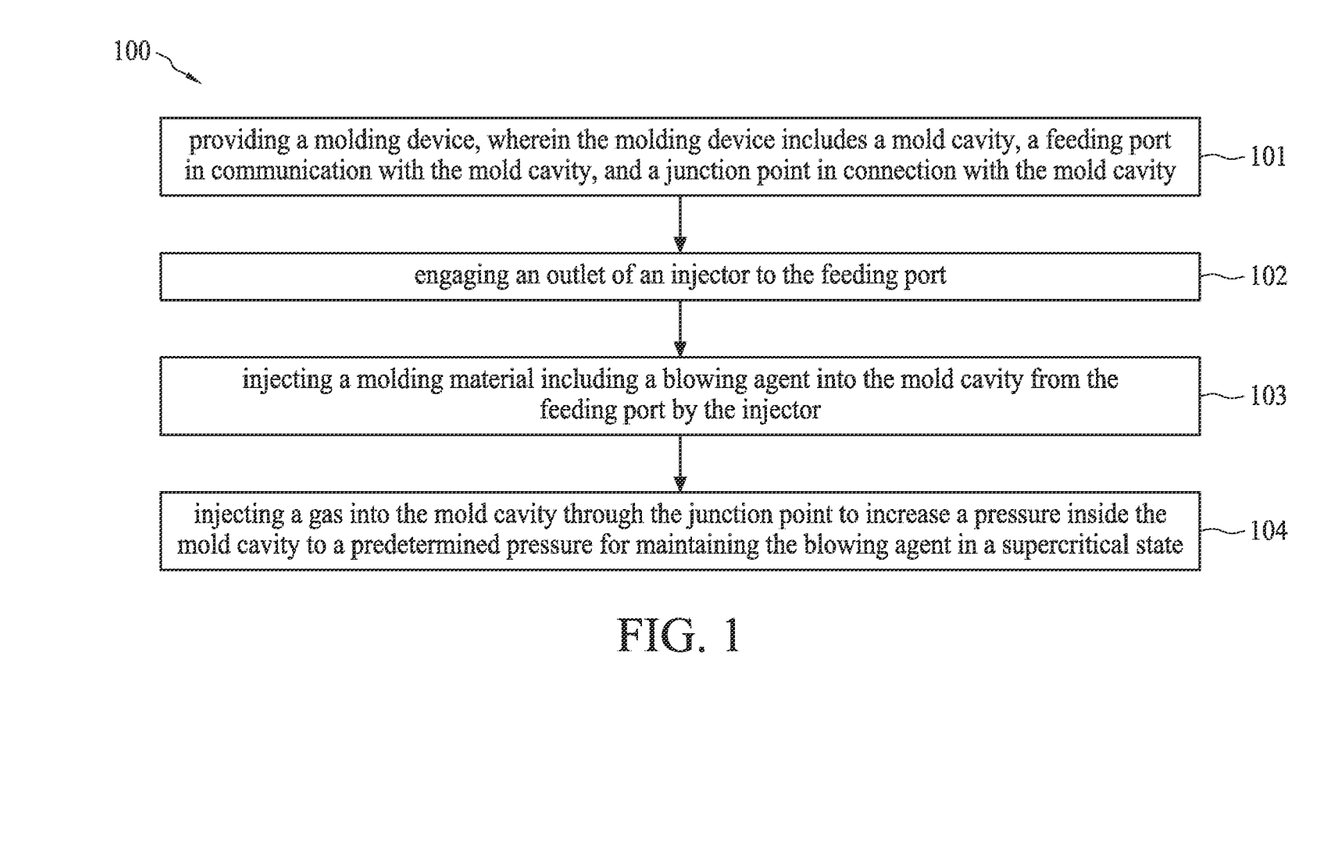
FIG. 1 is a flowchart illustrating a molding method according to one embodiment of the present invention.

FIG. 1 is a flowchart showing a molding method 100 in accordance with some embodiments of the present disclosure. The molding method 100 includes several operations: (101) providing a molding device, wherein the molding device includes a mold cavity, a feeding port in communication with the mold cavity, and a junction point in connection with the mold cavity; (102) engaging an outlet of an injector to the feeding port; (103) injecting a molding material including a blowing agent into the mold cavity from the feeding port by the injector; and (104) injecting a gas into the mold cavity through the junction point to increase a pressure inside the mold cavity to a predetermined pressure for maintaining the blowing agent in a supercritical state.

Figure 2:
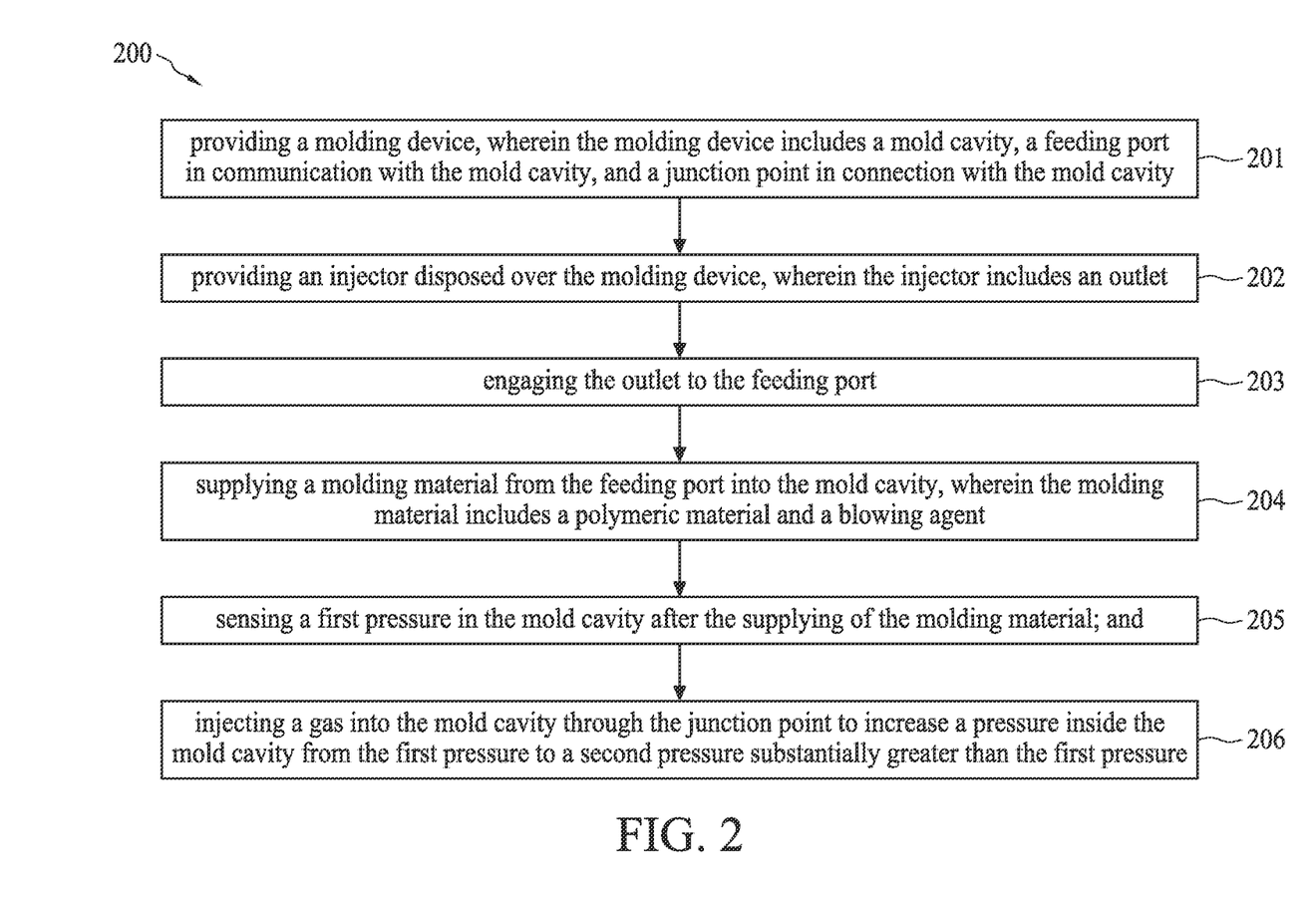
FIG. 2 is a flowchart illustrating a molding method according to one embodiment of the present invention.

FIG. 2 is a flowchart showing a molding method 200 in accordance with some embodiments of the present disclosure. The molding method 200 includes several operations: (201) providing a molding device, wherein the molding device includes a mold cavity, a feeding port in communication with the mold cavity, and a junction point in connection with the mold cavity; (202) providing an injector disposed over the molding device, wherein the injector includes an outlet; (203) engaging the outlet to the feeding port; (204) supplying a molding material from the feeding port into the mold cavity, wherein the molding material includes a polymeric material and a blowing agent; (205) sensing a first pressure in the mold cavity after the supplying of the molding material; and (206) injecting a gas into the mold cavity through the junction point to increase a pressure inside the mold cavity from the first pressure to a second pressure substantially greater than the first pressure.

In order to illustrate concepts and the molding methods 100, 200 of the present disclosure, various embodiments are provided below. However, the present disclosure is not intended to be limited to specific embodiments. In addition, elements, conditions or parameters illustrated in different embodiments can be combined or modified to form different combinations of embodiments as long as the elements, parameters or conditions used are not in conflict. For ease of illustration, reference numerals with similar or same functions and properties are repeated in different embodiments and figures. The various operations and the resulting formed articles of the injection molding method can be in various configurations as shown in any of FIGS. 3 to 6. The operations shown in 3 to FIG. 6 are also reflected schematically in the process flows of the molding method 100 and molding method 200 shown in FIGS. 1 and 2, respectively.

Figure 3:
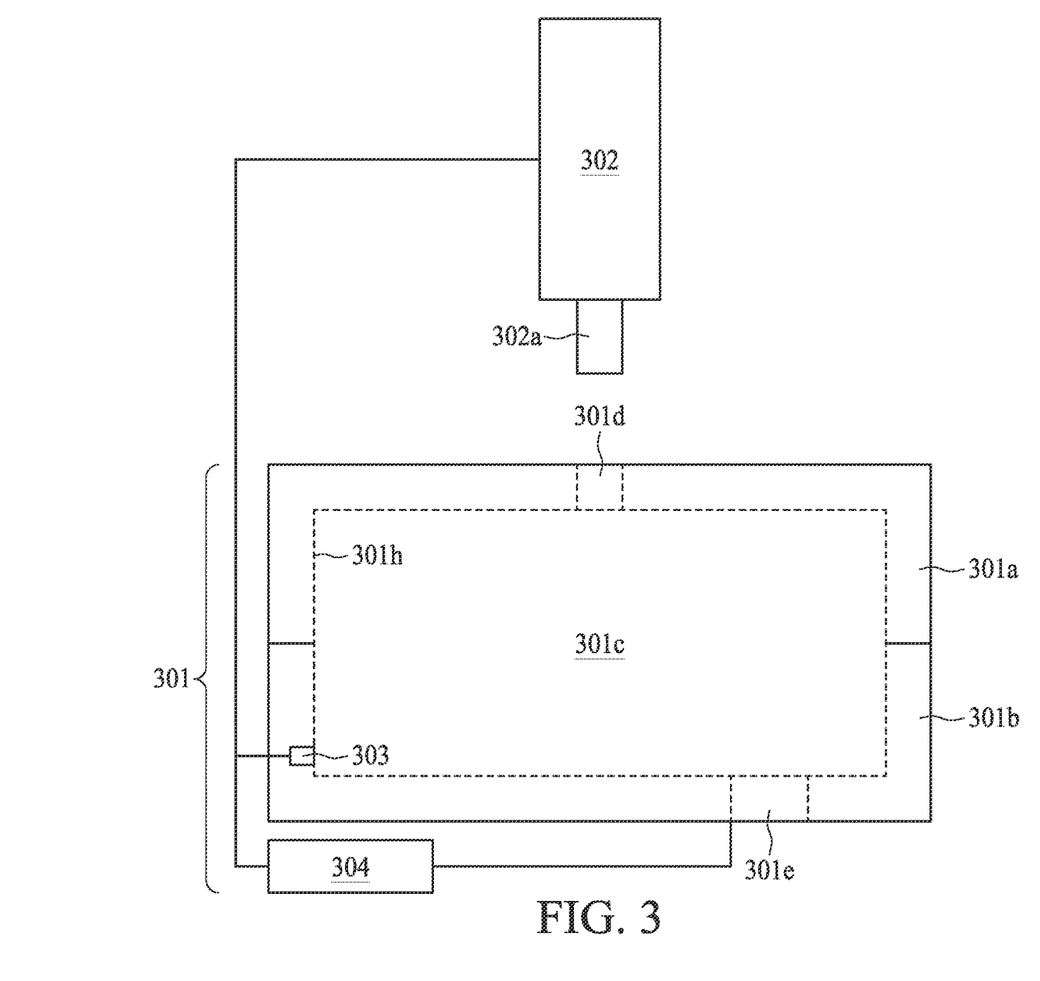
FIGS. 3 to 6 are schematic cross-sectional views illustrating exemplary operations in an injection molding method according to one embodiment of the present disclosure.

FIG. 3 is a schematic cross-sectional view illustrating a molding device 301. In some embodiments, referring to FIG. 3, a molding device 301 is provided or received. In some embodiments, an injector 302 disposed over the molding device 301 is provided or received. The respective process is illustrated as process 101 of the molding method 100 in the process flow shown in FIG. 1 and the processes 201 and 202 of the molding method 200 in the process flow shown in FIG. 2.

In some embodiments, the molding device 301 is configured for forming an article in a mold cavity 301c, such as a foamed polymer article. In some embodiments, a fluid or liquid including a molding material is injected into the mold cavity 301c and then the article is formed in the mold cavity 301c after a period of time. In some embodiments, the mold cavity 301c is sealed when the molding device 301 is closed.

In some embodiments, the molding device 301 includes a first mold 301a and a second mold 301b. In some embodiments, the first mold 301a corresponds to the second mold 301b in some properties such as dimension, shape or the like. The first mold 301a can be placed on and engaged with the second mold 301b. In some embodiments, the mold cavity 301c is defined by the first mold 301a and the second mold 301b disposed over and corresponding to the first mold 301a.

In some embodiments, the molding device 301 further includes a feeding port 301d in communication with the mold cavity 301c, and a junction point 301e in connection with the mold cavity 301c.

In some embodiments, the feeding port 301d extends through the molding device 301. In some embodiments, the feeding port 301d extends through the first mold 301a. The feeding port 301d is configured to allow the fluid or liquid to flow through. In some embodiments, the mold cavity 301c is accessible through the feeding port 301d. In some embodiments, the feeding port 301d is disposed at the first mold 301a or the second mold 301b. In some embodiments, the feeding port 301d is configured to engage with the injector 302 or the like. In some embodiments, a molding material or the like held by the injector 302 is flowable from the injector 302 into the mold cavity 301c through the feeding port 301d.

In some embodiments, the junction point 301e includes a passage extending through the molding device 301. In some embodiments, the junction point 301e includes a passage extending through the second mold 301b.

In some embodiments, the mold cavity 301c is accessible through the junction point 301e. In some embodiments, the junction point 301e is disposed at the first mold 301a or the second mold 301b. In some embodiments, the junction point 301e is configured to allow a fluid or liquid to flow through. In some embodiments, the junction point 301e is configured to allow a gas to flow through. For simplicity and clarity, only one junction point 301e is illustrated in FIG. 3, however, it can be understood that any suitable number of the junction points 301e can be configured at the first mold 301a and/or the second mold 301b.

In some embodiments, the feeding port 301d and the junction point 301e are separated from each other. In some embodiments, the feeding port 301d and the junction point 301e are disposed on opposite sides of the mold cavity 301c. In some embodiments, the feeding port 301d overlaps the junction point 301e from a top view. In some embodiments, the feeding port 301d is offset from the junction point 301e from a top view.

The injector 302 is configured to discharge a fluid or liquid from an outlet 302a of the injector 302. In some embodiments, the injector 302 is disposed above the feeding port 301d. In some embodiments, the injector 302 overlaps the feeding port 301d from a top view. In some embodiments, the outlet 302a overlaps the feeding port 301d from a top view. In some embodiments, a dimension of the outlet 302a corresponds to a dimension of the feeding port 301d.

Figure 4:
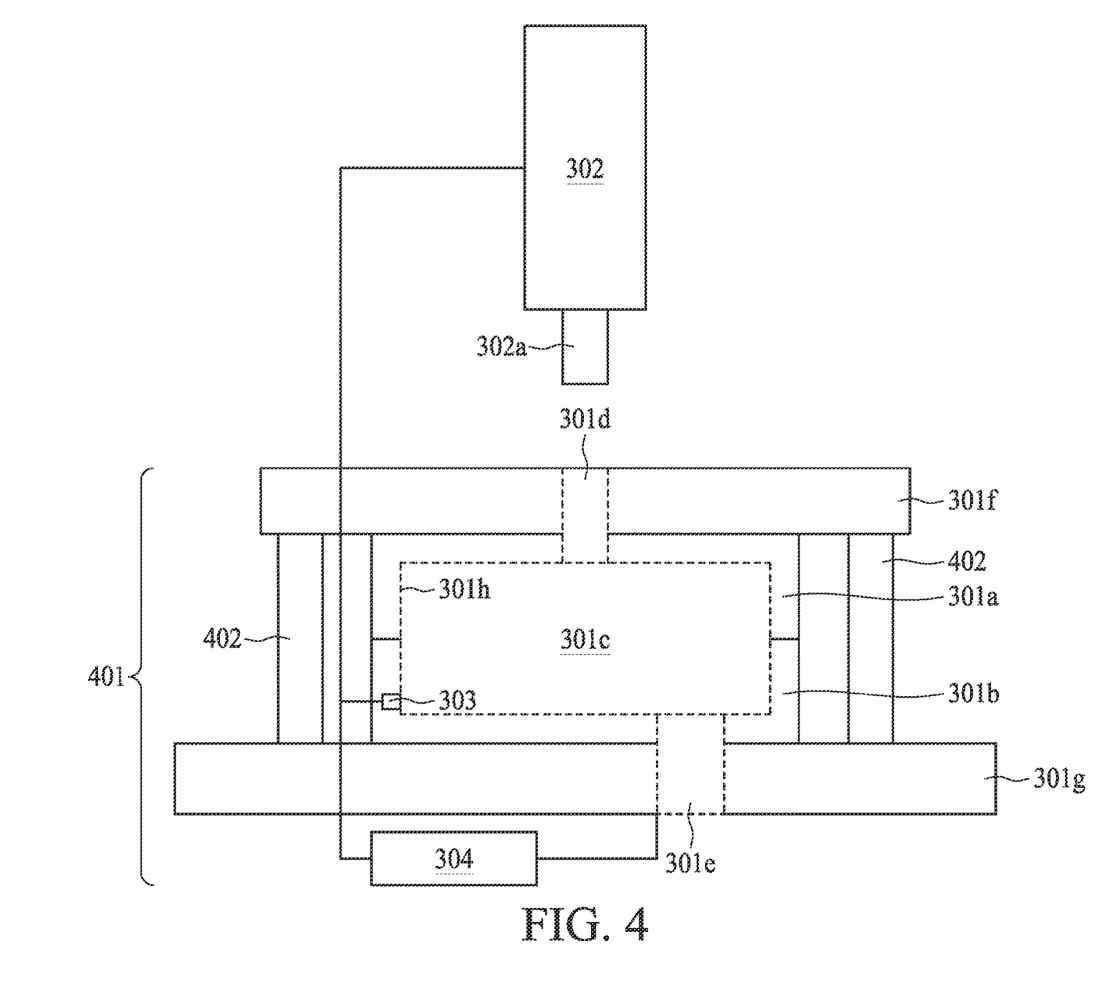

FIG. 4 is a schematic cross-sectional view illustrating a molding device 401. In some embodiments, referring to FIG. 4, the molding device 401 is provided or received. The respective process is illustrated as process 101 of the molding method 100 in the process flow shown in FIG. 1 and the process 201 of the molding method 200 in the process flow shown in FIG. 2.

In some embodiments, a clamping force is applied to the molding device 401. In some embodiments, the molding device 401 includes a first mold 301a, a second mold 301b, a mold cavity 301c, a first mold base 301f, a second mold base 301g, and a clamping unit 402 for clamping the molding device 401.

In some embodiments, the mold cavity 301c is defined by the first mold base 301f and the second mold base 301g disposed under and corresponding to the first mold base 301f. In some embodiments, the first mold 301a is disposed in the first mold base 301f, and the second mold 301b is disposed over and corresponding to the second mold base 301g. In some embodiments, the second mold base 301g corresponds to the first mold base 301f in some properties such as dimension, shape or the like. The first mold base 301f can be placed above the second mold base 301g.

In some embodiments, the feeding port 301d extends through the first mold 301a and the first mold base 301f. In some embodiments, the junction point 301e extends through the second mold 301b and the second mold base 301g. In some embodiments, an injector 302 is disposed over the molding device 401. In some embodiments, the injector 302 is disposed over the first mold base 301f.

In some embodiments, the clamping unit 402 is disposed between the first mold base 301f and the second mold base 301g. In some embodiments, the second mold base 301g is coupled with the first mold base 301f by the clamping unit 402. In some embodiments, the clamping unit 402 is adjacent to the first mold 301a and the second mold 301b. In some embodiments, the molding device 401 includes a plurality of clamping units 402. In some embodiments, the clamping unit 402 is configured to apply a clamping force to the second mold 301b and the first mold 301a. The clamping force can be applied on the first mold base 301f toward the second mold base 301g or vice versa.

In some embodiments, the first mold 301a and the second mold 301b can maintain engagement with each other by the clamping force provided by the clamping unit 402. In other words, the molding device 401 can be maintained in a closed configuration as shown in FIG. 4 by the clamping force from the clamping unit 402. In some embodiments, the clamping force can be applied continuously throughout an injection molding process. In some embodiments, the clamping force is in a range of about 5 newton (N) to 15 N. In some embodiments, the clamping force is about 10 N. In some embodiments, the molding device 401 is maintained in the closed configuration by the clamping force from the clamping unit 402 throughout the injection molding process.

In some embodiments, the molding methods 100, 200 are implemented by the molding device 301 shown in FIG. 3 or the molding device 401 shown in FIG. 4. In some embodiments, referring to FIGS. 3 and 4, a pressure in the mold cavity 301c is sensed. In some embodiments, each of the molding devices 301, 401 further includes a pressure-sensing unit 303 configured to sense the pressure in the mold cavity 301c. In some embodiments, the properties of the foamed polymer article are affected by pore size and distribution across the molding material, and the pore size and distribution are related to temperature, pressure, and feeding rate. The pressure-sensing unit 303 is not limited to any particular type, as long as it can sense the pressure and provide pressure information after sensing the pressure in the mold cavity 301c. The pressure-sensing unit 303 senses the condition in the mold cavity 301c, and the pressure in the mold cavity 301c may be adjusted in accordance with the pressure information, so that the foamed polymer article thus obtained has the desired predetermined shape and properties.

In some embodiments, the pressure-sensing unit 303 is disposed in the mold cavity 301c. In some embodiments, the pressure-sensing unit 303 is disposed in the first mold 301a or the second mold 301b. In some embodiments, the pressure-sensing unit 303 is disposed at an inner sidewall 301h of the mold cavity 301c and is away from the feeding port 301d. In some embodiments, the molding device 301 has a plurality of pressure-sensing units 303. A number and locations of the plurality of pressure-sensing units 303 are not particularly limited; for example, the pressure-sensing units can be arranged at the inner sidewall 301h of the mold cavity 301c and spaced apart from each other, and/or anywhere in the feeding port 301d, and/or anywhere at the junction point 301e; however, the present invention is not limited thereto.

In some embodiments, each of the molding devices 301, 401 further includes a control system 304. The control system 304 is configured to control an injection of a gas into the mold cavity 301c and the pressure inside the mold cavity 301c. In some embodiments, the pressure-sensing unit 303 provides the pressure information to the control system 304, and the control system 304 adjusts a gas supply condition in accordance with the pressure information. In some embodiments, the control system 304 adjusts the condition at which the gas enters into or exits from the mold cavity 301c in real time, in accordance with the pressure information, so that during the process of forming the foamed polymer article, the pressure in the mold cavity 301c is within a suitable or predetermined pressure range at all times. In some embodiments, the control system 304 further controls the feeding condition of the feeding port 301d, the injector 302 and the outlet 302a. In some embodiments, the control system 304, the junction point 301e, the injector 302, the outlet 302a and the feeding port 301d are electrically connected.

In some embodiments, referring to FIGS. 3 and 4, a pressure in the mold cavity 301c is increased to a first predetermined pressure. In some embodiments, a first gas is initially injected into the mold cavity 301c. In some embodiments, the first gas is injected through the junction point 301e. In some embodiments, the feeding port 301d is in a closed configuration while the first gas is injected through the junction point 301e. In some embodiments, examples of the first gas include inert gas, nitrogen, carbon dioxide, or the like. In some embodiments, the mold cavity 301c is filled with the first gas before a molding material is injected into the mold cavity 301c, such that the pressure inside the mold cavity 301c is increased. In some embodiments, the clamping force is applied to the molding device 401 by the clamping unit 402, and then the first gas is injected into the mold cavity 301c.

In some embodiments, the molding methods 100, 200 further include using the control system 304 to control the injection of the gas and the molding material into the mold cavity 301c, in accordance with the pressure in the mold cavity 301c sensed by the pressure-sensing unit 303.

In some embodiments, the pressure inside the mold cavity 301c is increased from one atmosphere (atm) to the first predetermined pressure by injecting the first gas into the mold cavity 301c. In some embodiments, the first gas is injected into the mold cavity 301c until the mold cavity 301c reaches the first predetermined pressure. In some embodiments, the first predetermined pressure is in a range of about 5 kg/cm$^2$ to 20 kg/cm$^2$. In some embodiments, the first predetermined pressure is about 10 kg/cm$^2$. In some embodiments, the junction point 301e is in a closed configuration when the mold cavity 301c reaches the first predetermined pressure, such that the first gas is no longer flowable into or out of the mold cavity 301c.

In some embodiments, the clamping force is continuously applied to the molding device 401 by the clamping unit 402 in order to maintain the mold cavity 301c at the first predetermined pressure.

Figure 5:
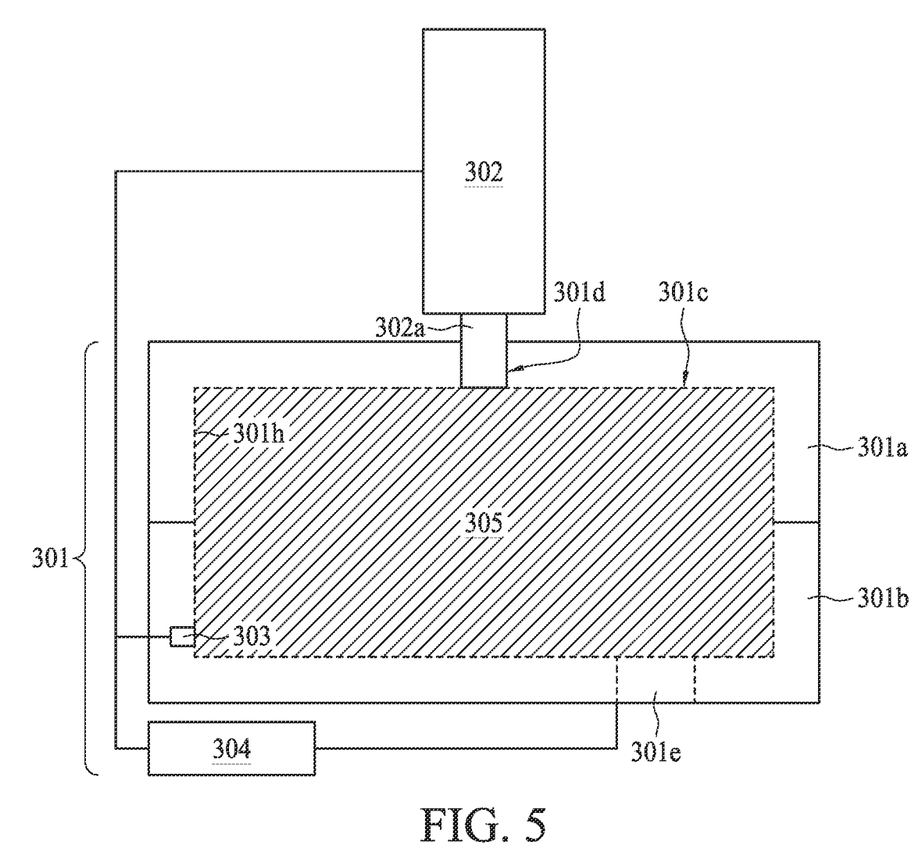
Figure 6:
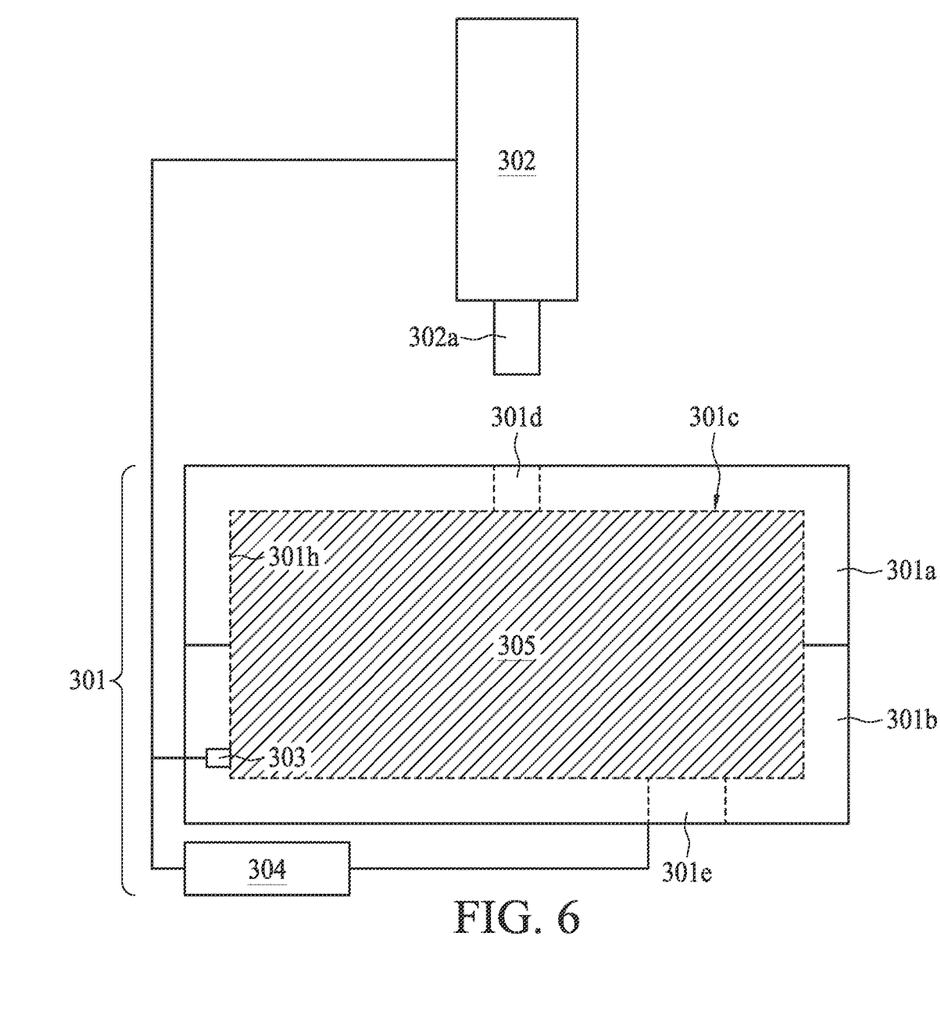

In some embodiments, referring to FIG. 5, the outlet 302a of the injector 302 is engaged to the feeding port 301d. The respective process is illustrated as process 102 of the molding method 100 in the process flow shown in FIG. 1 and the process 203 of the molding method 200 in the process flow shown in FIG. 2. In some embodiments, after the pressure in the mold cavity 301c is increased to the first predetermined pressure, the injector 302 holding a molding material 305 engages with the molding device 301. In some embodiments, the outlet 302a of the injector 302 engages with the feeding port 301d, such that the molding material 305 is flowable from the injector 302 into the mold cavity 301c through the outlet 302a and the feeding port 301d. In some embodiments, the pressure in the mold cavity 301c is increased to the first predetermined pressure after the injector 302 is engaged to the feeding port 301d.

In some embodiments, the molding material 305 includes a polymeric material and a blowing agent. In some embodiments, the polymeric material includes ethylene vinyl acetate (EVA), styrene-ethylene-butylene-styrene (SEBS), thermoplastic polyurethanes (TPU), thermoplastic polyester elastomer (TPEE) or the like. In some embodiments, the molding material 305 includes a foamable material.

In some embodiments, the blowing agent is a physical or chemical additive that releases gas during a heating process, thereby forming bubbles. In some embodiments, the blowing agent can be any type of physical blowing agent known to those of ordinary skill in the art. In some embodiments, the blowing agent is a supercritical fluid. The supercritical fluid may include inert gas such as carbon dioxide or nitrogen, hydrocarbons, chlorofluorocarbons or mixtures thereof. The technical details of mixing the polymeric material and the blowing agent are known in the prior art, and description thereof is omitted herein. The blowing agent may be supplied in any flowable physical state, for example, gas, liquid, or supercritical fluid (SCF). In some embodiments, the blowing agent is in the supercritical state.

After the engagement of the injector 302 with the molding device 301, in some embodiments, the molding material 305 including the blowing agent flows from the injector 302 into the mold cavity 301c. The respective process is illustrated as process 103 of the molding method 100 in the process flow shown in FIG. 1 and the process 204 of the molding method 200 in the process flow shown in FIG. 2.

The mold cavity 301c is then filled with the molding material 305. In some embodiments, a duration of the supplying of the molding material 305 is about 0.5 second to about 1 second. In some embodiments, a pressure for injecting the molding material 305 from the injector 302 into the mold cavity 301c is substantially greater than the first predetermined pressure inside the mold cavity 301c. In some embodiments, the pressure for injecting the molding material 305 from the injector 302 is in a range of about 150 kg/cm$^2$ to about 250 kg/cm$^2$. In some embodiments, the pressure for injecting the molding material 305 from the injector 302 is about 200 kg/cm$^2$.

In some embodiments, during or after the injection of the molding material 305 into the mold cavity 301c, the pressure in the mold cavity 301c may decrease, which is undesirable because the pressure decrease may result in premature foaming of the polymeric material. The premature foaming may result in bubbles being squeezed out from the polymeric material, uneven distribution of bubbles formed in the molding material 305, etc. As such, the premature foaming may adversely affect a quality of an article subsequently formed from the molding material 305. In some embodiments, the pressure inside the mold cavity 301c may decrease from the first predetermined pressure to a first pressure substantially lower than the first predetermined pressure. In some embodiments, the pressure inside the mold cavity 101c decreases to the first pressure substantially lower than a required pressure for maintaining the blowing agent in the supercritical state.

In some embodiments, the control system 304 receives the pressure information provided by the pressure-sensing unit 303, and the control system 304 controls the injecting condition of the injector 302 and the outlet 302a (including, but not limited to, injecting time, injecting rate, etc. of the outlet 302a). In some embodiments, the control system 304 receives the pressure information provided by the pressure-sensing unit 303, and controls the feeding condition of the feeding port 301d (including, but not limited to, feeding time, feeding rate, etc. of the feeding port 301d) in accordance with the pressure information.

In some embodiments, the first pressure in the mold cavity 301c after the injection of the molding material 305 is sensed. The respective process is illustrated as the process 205 of the molding method 200 in the process flow shown in FIG. 2. In some embodiments, the first pressure is sensed by the pressure-sensing unit 303.

After the injection of the molding material 305 into the mold cavity 301c, in some embodiments, referring to FIG. 6, the injector 302 disengages and withdraws from the molding device 301. In some embodiments, the outlet 302a of the injector 302 disengages from the feeding port 301d. In some embodiments, the feeding port 301d is closed after the injection of the molding material 305. In some embodiments, the feeding port 301d is in the closed configuration after the disengagement of the injector 302 from the molding device 301. In some embodiments, the closing of the feeding port 301d and the withdrawing of the injector 302 are performed simultaneously.

After the injection of the molding material 305 into the mold cavity 301c, the pressure inside the mold cavity 301c is increased. In some embodiments, a second gas is injected into the mold cavity 301c through the junction point 301e to increase the pressure inside the mold cavity 301c. In some embodiments, a gas is injected into the mold cavity 301c through the junction point 301e to increase the pressure inside the mold cavity 301c to a predetermined pressure for maintaining the blowing agent in a supercritical state. In some embodiments, the pressure inside the mold cavity 301c is increased to a second predetermined pressure for maintaining the blowing agent in a supercritical state. In some embodiments, the second predetermined pressure is substantially greater than the first pressure. The respective processes are illustrated as the process 104 of the molding method 100 in the process flow shown in FIG. 1 and the process 206 of the molding method 200 in the process flow shown in FIG. 2.

In some embodiments, the increase of the pressure inside the mold cavity 301c is performed before, during or after the disengagement of the injector 302 from the molding device 301. In some embodiments, the increase of the pressure inside the mold cavity 301c is performed immediately after the injection of the molding material 305 into the mold cavity 301c. In some embodiments, the increase of the pressure inside the mold cavity 301c is performed after the feeding port 301d is closed. In some embodiments, the increase of the pressure inside the mold cavity 301c can be implemented by injecting the second gas into the mold cavity 301c. In some embodiments, the clamping force is applied to the molding device 401 during the injecting of the second gas.

In some embodiments, the pressure inside the mold cavity 301c can be maintained at a pressure substantially greater than or equal to the required pressure for maintaining the blowing agent in the supercritical state. Therefore, the increase of the pressure inside the mold cavity 301c after the injection of the molding material 305 into the mold cavity 301c can reduce or even prevent the premature foaming of the molding material 305. In some embodiments, the second gas is configured to increase the pressure inside the mold cavity 301c from the first pressure to the second predetermined pressure for maintaining the blowing agent of the molding material 305 in a supercritical state. In some embodiments, the second predetermined pressure is substantially greater than or equal to the required pressure for maintaining the blowing agent in the supercritical state. In some embodiments, the composition of the second gas is similar to or different from that of the first gas. In some embodiments, the compositions of the first gas and the second gas are the same.

In some embodiments, the blowing agent is in a supercritical state at the second predetermined pressure. In some embodiments, the second predetermined pressure is substantially greater than the pressure in the mold cavity 301c before the injecting of the second gas. In some embodiments, the second predetermined pressure is substantially greater than the first predetermined pressure. In some embodiments, the second predetermined pressure is substantially greater than the pressure in the mold cavity 301c before the injecting of the first gas. In some embodiments, the second predetermined pressure is substantially greater than one atmosphere. In some embodiments, the second predetermined pressure is substantially greater than or equal to 20 kg/cm$^2$. In some embodiments, the second predetermined pressure is substantially greater than or equal to 35 kg/cm$^2$. In some embodiments, the pressure in the mold cavity 301c is sensed during and after the injection of the molding material 305.

In some embodiments, the pressure inside the mold cavity 301c is gradually increased to the second predetermined pressure. In some embodiments, the pressure inside the mold cavity 301c is increased incrementally.

In some embodiments, the pressure inside the mold cavity 301c is increased from the first pressure (i.e., the pressure immediately after the injection of the molding material 305 into the mold cavity 301c) to a third predetermined pressure, and then the pressure inside the mold cavity 301c is increased from the third predetermined pressure to the second predetermined pressure. The second predetermined pressure is substantially greater than the third predetermined pressure. In some embodiments, the second predetermined pressure and the third predetermined pressure are substantially greater than one atmosphere. In some embodiments, the injecting of the gas includes injecting a first amount of the second gas into the mold cavity 301c to increase the pressure in the mold cavity 301c from the first pressure to the third predetermined pressure, and injecting a second amount of the second gas into the mold cavity 301c to increase the pressure in the mold cavity 301c from the third predetermined pressure to the second predetermined pressure. In some embodiments, the first amount of the second gas is substantially less than or equal to the second amount of the second gas.

In some embodiments, the pressure inside the mold cavity 301c is increased from the first pressure to a third predetermined pressure, and then from the third predetermined pressure to a fourth predetermined pressure substantially greater than the third predetermined pressure, and finally from the fourth predetermined pressure to the second predetermined pressure substantially greater than the first pressure, the third predetermined pressure, and the fourth predetermined pressure. The second predetermined pressure is substantially greater than the fourth predetermined pressure. In some embodiments, the fourth predetermined pressure is substantially greater than one atmosphere.

In some embodiments, an adjustment of the pressure inside the mold cavity 301c is performed after the process 104 of the molding method 100 or the process 206 of the molding method 200. In some embodiments, after the increase of the pressure inside the mold cavity 301c to the second predetermined pressure, the pressure inside the mold cavity 301c can then be adjusted by increasing or decreasing the pressure inside the mold cavity 301c. In some embodiments, the adjustment of the pressure inside the mold cavity 301c is based on a foaming progress of the molding material 305, the pressure inside the mold cavity 101c in real time, an elasticity of the foamed polymer article subsequently formed from the molding material 305, and other factors.

In some embodiments, after the process 104 of the molding method 100 or the process 206 of the molding method 200, at least a portion of the gas in the mold cavity 301c is discharged from the mold cavity 301c to decrease the pressure in the mold cavity 301c to a fifth predetermined pressure substantially less than the second predetermined pressure. In some embodiments, the fifth predetermined pressure is substantially less than the first pressure, the third predetermined pressure and the fourth predetermined pressure.

In some embodiments, the foamed polymer article is formed from the molding material 305. In some embodiments, the foamed polymer article is formed in the mold cavity 301c. The foamed polymer article can be removed from the mold cavity 301c when the molding device 301, 401 is in an open configuration. In some embodiments, the clamping force is removed before the foamed polymer article is removed from the mold cavity 301c.

An aspect of this disclosure relates to a molding method including providing a molding device, wherein the molding device includes a mold cavity, a feeding port in communication with the mold cavity, and a junction point in connection with the mold cavity; engaging an outlet of an injector to the feeding port; injecting a molding material including a blowing agent into the mold cavity from the feeding port by the injector; and injecting a gas into the mold cavity through the junction point to increase a pressure inside the mold cavity to a predetermined pressure for maintaining the blowing agent in a supercritical state.

In some embodiments, the method further includes sensing a pressure in the mold cavity during and after the injection of the molding material, wherein the predetermined pressure is substantially greater than the pressure in the mold cavity before the injecting of the gas. In some embodiments, the predetermined pressure is substantially greater than or equal to 20 kg/cm². In some embodiments, the method further includes withdrawing the injector from the molding device after the injection of the molding material, and closing the feeding port after the injection of the molding material and before the injection of the gas. In some embodiments, the injection of the gas includes increasing the pressure in the mold cavity to a first pressure, and then increasing the pressure in the mold cavity from the first pressure to a second pressure substantially greater than the first pressure. In some embodiments, after the injection of the molding material into the mold cavity, the pressure inside the mold cavity is reduced to a first pressure substantially less than the predetermined pressure.

An aspect of this disclosure relates to a molding method. The method includes providing a molding device, wherein the molding device includes a mold cavity, a feeding port in communication with the mold cavity, and a junction point in connection with the mold cavity; providing an injector disposed over the molding device, wherein the injector includes an outlet; engaging the outlet to the feeding port; supplying a molding material from the feeding port into the mold cavity, wherein the molding material includes a polymeric material and a blowing agent; sensing a first pressure in the mold cavity after the supplying of the molding material; and injecting a gas into the mold cavity through the junction point to increase a pressure inside the mold cavity from the first pressure to a second pressure substantially greater than the first pressure.

In some embodiments, the blowing agent is in a supercritical state at the second pressure. In some embodiments, the second pressure is substantially greater than or equal to 35 kg/cm².

In some embodiments, the method further includes increasing the pressure inside the mold cavity from the first pressure to a third pressure, and then increasing the pressure inside the mold cavity from the third pressure to the second pressure.

In some embodiments, the second pressure is substantially greater than the third pressure. In some embodiments, the second pressure and the third pressure are substantially greater than one atmosphere. In some embodiments, the injecting of the gas includes injecting a first amount of the gas into the mold cavity to increase the pressure inside the mold cavity from the first pressure to the third pressure, and injecting a second amount of the gas into the mold cavity to increase the pressure inside the mold cavity from the third pressure to the second pressure. In some embodiments, the first amount of the gas is substantially less than or equal to the second amount of the gas. In some embodiments, the pressure inside the mold cavity is in a range between 5 kg/cm² and 20 kg/cm² before the supplying of the molding material into the mold cavity.

In some embodiments, the method further includes discharging the gas from the mold cavity to decrease the pressure in the mold cavity to a fourth pressure substantially less than the second pressure. In some embodiments, the fourth pressure is substantially less than the first pressure and the third pressure. In some embodiments, the method further includes applying a clamping force to the molding device during the injecting of the gas. In some embodiments, a duration of the supplying of the molding material is between about 0.5 second and about 1 second. In some embodiments, the method further includes providing a control system configured to control the injection of the gas into the mold cavity and the pressure inside the mold cavity.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A molding method, comprising:
providing a molding device, wherein the molding device includes a mold cavity, a feeding port in communication with the mold cavity, and a junction point in connection with the mold cavity;
engaging an outlet of an injector to the feeding port;
injecting a first gas into the mold cavity through the junction point to increase a pressure in the mold cavity to a first pressure;
injecting a molding material including a blowing agent into the mold cavity having the first pressure from the feeding port by the injector; and
after accomplishment of the injection of the molding material, injecting a second gas into the mold cavity through the junction point to increase the first pressure inside the mold cavity to a predetermined pressure for maintaining the blowing agent in a supercritical state, wherein the predetermined pressure is substantially greater than the first pressure.

2. The method of claim 1, further comprising sensing the pressure in the mold cavity during and after the injection of the molding material, wherein the predetermined pressure is substantially greater than the pressure in the mold cavity before the injecting of the second gas.

3. The method of claim 1, wherein the predetermined pressure is substantially greater than or equal to 20 kg/cm2.

4. The method of claim 1, further comprising:
withdrawing the injector from the molding device after the injection of the molding material; and
closing the feeding port after the injection of the molding material and before the injection of the second gas.

5. The method of claim 1, wherein the injection of the second gas includes increasing the pressure in the mold cavity to a second pressure, then increasing the pressure in the mold cavity from the second pressure to a third pressure substantially greater than the second pressure.

6. The method of claim 1, wherein after the injection of the molding material into the mold cavity, a pressure inside the mold cavity is reduced to a second pressure substantially less than the predetermined pressure.

7. A molding method, comprising:
providing a molding device, wherein the molding device includes a mold cavity, a feeding port in communication with the mold cavity, and a junction point in connection with the mold cavity;
providing an injector disposed over the molding device, wherein the injector includes an outlet;
engaging the outlet to the feeding port;
injecting a first gas into the mold cavity through the junction point to increase a pressure in the mold cavity to a first pressure;
supplying a molding material from the feeding port into the mold cavity, wherein the molding material includes a polymeric material and a blowing agent;
sensing a second pressure in the mold cavity after accomplishment of the supplying of the molding material; and
injecting a second gas into the mold cavity through the junction point to increase a pressure inside the mold cavity from the second pressure to a third pressure substantially greater than the second pressure.

8. The method of claim 7, wherein the blowing agent is in a supercritical state at the second pressure.

9. The method of claim 7, wherein the third pressure is substantially greater than or equal to 35 kg/cm2.

10. The method of claim 7, wherein the first gas and the second gas are inert gas.

11. The method of claim 7, wherein the third pressure is substantially greater than the first pressure.

12. The method of claim 7, wherein the first pressure and the third pressure are substantially greater than one atmosphere.

13. The method of claim 7, wherein the molding device further includes a clamping unit configured to apply a clamping force to the molding device, wherein the clamping force is applied continuously throughout the supplying of the polymeric material and the injection of the gas.

14. The method of claim 13, wherein the clamping force is applied before the injection of the first gas.

15. The method of claim 7, wherein the first pressure in the mold cavity is in a range between 5 kg/cm2 and 20 kg/cm2 before the supplying of the molding material into the mold cavity.

16. The method of claim 7, further comprising discharging the gas from the mold cavity to decrease the pressure in the mold cavity to a fourth pressure substantially less than the third pressure.

17. The method of claim 16, wherein the fourth pressure is substantially less than the first pressure and the second pressure.

18. The method of claim 7, further comprising applying a clamping force to the molding device during the injecting of the gas.

19. The method of claim 7, wherein a duration of the supplying of the molding material is between about 0.5 second and about 1 second.

20. The method of claim 7, further comprising providing a control system configured to control the injection of the gas into the mold cavity and the pressure inside the mold cavity.

* * * * *